(12) United States Patent
Debevec et al.

(10) Patent No.: US 10,375,264 B2
(45) Date of Patent: Aug. 6, 2019

(54) MULTISPECTRAL LIGHTING REPRODUCTION

(71) Applicant: University of Southern California, Los Angeles, CA (US)

(72) Inventors: Paul E. Debevec, Marina del Ray, CA (US); Chloe Legendre, Los Angeles, CA (US); Sumanta Pattanaik, Orlando, FL (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 15/582,522

(22) Filed: Apr. 28, 2017

(65) Prior Publication Data

US 2017/0318178 A1 Nov. 2, 2017

Related U.S. Application Data

(60) Provisional application No. 62/329,136, filed on Apr. 28, 2016.

(51) Int. Cl.
*G06K 9/00* (2006.01)
*H04N 1/028* (2006.01)
*H04N 1/60* (2006.01)
*H04N 1/64* (2006.01)
*G08B 13/196* (2006.01)
(Continued)

(52) U.S. Cl.
CPC ............ *H04N 1/0284* (2013.01); *G01J 3/505* (2013.01); *G06T 15/50* (2013.01); *G08B 13/19634* (2013.01); *H04N 1/6086* (2013.01); *H04N 1/64* (2013.01)

(58) Field of Classification Search
CPC ...... H04N 1/0284; H04N 1/64; H04N 1/6086; G01J 3/505; G06T 15/50; G08B 13/19634
See application file for complete search history.

(56) References Cited

U.S. PATENT DOCUMENTS 7,436,403 B2 * 10/2008 Debevec ................ H04N 5/222
345/426
2005/0018223 A1 * 1/2005 Debevec ................ H04N 1/603
358/1.9

(Continued)

OTHER PUBLICATIONS

Debevec et al., "A Lighting Reproduction Approach to Live-Action Compositing", SIGGRAPH 2002, ACM Transactions on Graphics (TOG), vol. 21, Issue 3, Jul. 2002, pp. 547-556 (10 pages).

(Continued)

*Primary Examiner* — Amir Alavi
(74) *Attorney, Agent, or Firm* — Fish & Richardson P.C.

(57) ABSTRACT

Systems and techniques for multispectral lighting reproduction, in one aspect, include: one or more light sources having different lighting spectra; and one or more computers comprising at least one processor and at least one memory device, the one or more computers programmed to drive the one or more light sources directly using intensity coefficients that have been determined by comparing first data for a multi-color reference object photographed by a camera in a scene with second data for the multi-color reference object photographed when lit by respective ones of the different lighting spectra of the one or more light sources.

29 Claims, 11 Drawing Sheets
(6 of 11 Drawing Sheet(s) Filed in Color)

(51) Int. Cl.
*G01J 3/50* (2006.01)
*G06T 15/50* (2011.01)

(56) References Cited

U.S. PATENT DOCUMENTS

| | | | | |
|---|---|---|---|---|
| 2007/0092135 | A1* | 4/2007 | Piirainen | H04N 1/6086 |
| | | | | 382/167 |
| 2012/0197599 | A1* | 8/2012 | Seibel, II | G01J 1/10 |
| | | | | 702/189 |
| 2012/0308124 | A1* | 12/2012 | Belhumeur | G06K 9/00281 |
| | | | | 382/159 |
| 2014/0265928 | A1* | 9/2014 | Wagner | G09G 3/3413 |
| | | | | 315/297 |
| 2016/0192459 | A1* | 6/2016 | Siminovitch | F25D 27/005 |
| | | | | 315/84 |
| 2016/0338795 | A1* | 11/2016 | Vayser | A61B 90/30 |
| 2017/0045201 | A1* | 2/2017 | Jones | F21V 9/30 |
| 2017/0318178 | A1* | 11/2017 | Debevec | H04N 1/0284 |

OTHER PUBLICATIONS

Hamon et al., "Gravity: Motion Control and Face Integration", SIGGRAPH 2014, ACM SIGGRAPH 2014 Talks, Article No. 35, 1 page, ISBN 978-1-4503-2960-6.

Wenger et al., "Optimizing Color Matching in a Lighting Reproduction System for Complex Subject and Illuminant Spectra", EGRW '03 Proceedings of the 14th Eurographics Symposium on Rendering, 2003, pp. 249-259 (11 pages + Figures 14 & 15 page), ISBN 3-905673-03-7.

* cited by examiner

MULTISPECTRAL LIGHTING REPRODUCTION

CROSS-REFERENCE TO RELATED APPLICATION

This application claims the benefit under 35 U.S.C. § 119(e) of U.S. Patent Application No. 62/329,136 entitled "MULTISPECTRAL LIGHTING REPRODUCTION", filed Apr. 28, 2016, which is incorporated herein by reference in its entirety.

STATEMENT AS TO FEDERALLY SPONSORED RESEARCH

This invention was made with government support under Grant No. W911NF-14-D-0005 awarded by U.S. Army Research Laboratory—Army Research Office. The government has certain rights in the invention.

BACKGROUND

This specification relates to systems and techniques for lighting reproduction.

Lighting greatly influences how a subject appears in both a photometric and aesthetic sense. And when a subject recorded in a studio is composited into a real or virtual environment, their lighting will either complement or detract from the illusion that they are actually present within the scene. Thus, being able to match studio lighting to real-world illumination environments is a useful capability for visual effects, studio photography, and in designing consumer products, garments, and cosmetics.

SUMMARY

This specification describes technologies relating to multispectral lighting reproduction, such as from RGB (Red, Green, Blue) panoramic imagery using color chart photographs.

In general, one or more aspects of the subject matter described in this specification can be embodied in one or more systems that include: one or more light sources having different lighting spectra; and one or more computers comprising at least one processor and at least one memory device, the one or more computers programmed to drive the one or more light sources directly using intensity coefficients that have been determined by comparing first data for a multi-color reference object photographed by a camera in a scene with second data for the multi-color reference object photographed when lit by respective ones of the different lighting spectra of the one or more light sources.

In general, one or more aspects of the subject matter described in this specification can be embodied in one or more methods that include: determining light intensity coefficients by minimizing a difference between (i) photograph of a multi-color reference object taken by a camera in a scene and (ii) a recorded set of multiple bases for an appearance of the multi-color reference object from photographs taken of the multi-color reference object when lit by respective ones of multiple light spectra; driving light sources in a lighting stage directly using the determined light intensities coefficients; and capturing imagery of a subject in the lighting stage illuminated by the light sources as they are driven using the determined light intensity coefficients.

A practical framework is presented for reproducing omnidirectional incident illumination conditions with complex spectra using an LED (Light Emitting Diode) sphere with multispectral LEDs. For lighting acquisition, standard RGB panoramic photography can be augmented with one or more observations of a color chart. Further, the LEDs in each light source can be driven to match the observed RGB color of the environment to best approximate the spectral lighting properties of the scene illuminant. Even when solving for non-negative intensities, it is shown that accurate illumination matches can be achieved with as few as four LEDs of distinct spectra for the entire ColorChecker chart for a wide gamut of incident illumination spectra.

A significant benefit of this approach is that it does not require the use of specialized equipment (other than the LED sphere) such as monochromators, spectroradiometers, or explicit knowledge of the LED power spectra, camera spectral response curves, or color chart reflectance spectra. Two useful and easy to construct devices for multispectral illumination capture are described, one for slow measurements of detailed angular spectral detail, and one for fast measurements with coarse spectral detail. The approach is validated by realistically compositing real subjects into acquired lighting environments, showing accurate matches to how the subject would actually look within the environments, even for environments with mixed illumination sources, and real-time lighting capture and playback is demonstrated using the systems and techniques described. The disclosed techniques also realize the advantages associated with minimizing color error directly, thereby potentially producing optimal results. Moreover, the lighting capture approaches disclosed herein are faster as compared to some traditional light probe photography techniques. Various multispectral lighting reproduction techniques, for example using red, green, blue, cyan, amber, and white (RGBCAW), are capable of yielding substantially close matches for many environment materials. Other multispectral lighting reproduction techniques utilizing fewer lighting spectra, for example using red, green, blue, and white (RGBW), also produce sufficiently good results for some applications. Various combinations of multispectral lighting reproduction techniques are demonstrated to be superior for color reproduction capability as compared with RGB LED based illumination alone.

The details of one or more embodiments of the subject matter described in this specification are set forth in the accompanying drawings and the description below. Other features, aspects, and advantages of the invention will become apparent from the description, the drawings, and the claims.

DRAWING DESCRIPTIONS

The patent of application file contains at least one drawing executed in color. Copies of this patent or patent application publication with color drawings(s) will be provided by the Office upon request and payment of the necessary fee.

Like reference numbers and designations in the various drawings indicate like elements.

DETAILED DESCRIPTION

Lighting reproduction involves the capture of a lighting environment, which can be achieved using omnidirectional photography techniques, followed by reproducing the captured lighting environment within a lighting stage from the record of scene illumination. The lighting can be reproduced using an algorithm that uses color channels of Light Emitting Diodes (LEDs) that are in excess of Red, Green and Blue (RGB), as described in detail below. As described below, standard lighting reproduction techniques can be augmented by photographing multicolor reference objects in order to improve the color rendition capabilities of the approach. Improved color rendition implies that the colors observed in the captured lighting environment better match the colors observed in the reproduced lighting environment.

Figure 1:
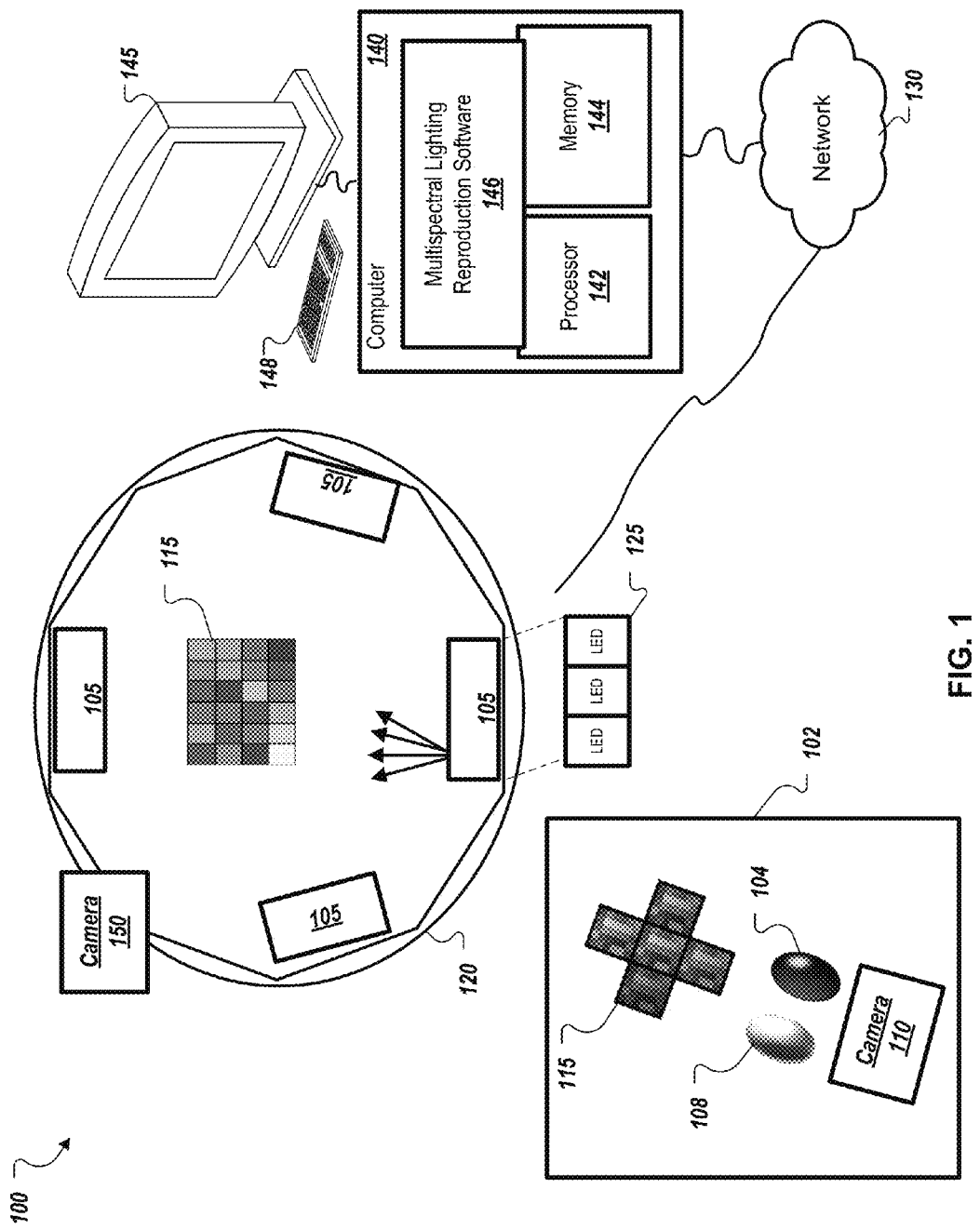
FIG. 1 shows an example of a multispectral lighting reproduction system employed to reproduce illumination conditions with multiple spectra.

FIG. 1 shows an example of a multispectral lighting reproduction system 100. The system can be used for reproducing illumination conditions, such as omnidirectional incident illumination, with complex spectra using a light stage 120 with multiple multispectral light sources 105. For instance, the system 100 is described herein in conjunction with techniques involving capturing incident illumination and driving multispectral light sources in order to reproduce the effect of illumination of a subject as seen by a camera 110.

Lighting reproduction can be done in a lighting stage 120 (light dome, box, etc.) that includes a number of multispectral light sources 105, and taking into account an original lighting environment in a multispectral manner. The lighting stage 120 is illustrated in FIG. 1 as an omnidirectional lighting sphere (note that the sphere need not be a complete sphere, e.g., no lights need be placed on a floor where an actor stands within the lighting sphere). In other cases, the lighting stage 120 can be configured as any number of other geometric shapes that effectively illuminate a subject from multiple directions, as deemed necessary or appropriate. The lighting stage 120 is shown to have multiple light sources 105, with each light source 105 capable of emitting different lighting spectra. The light sources 105 include various spectral light sources 125. FIG. 1 shows the light source 105 as having three LEDs 125, or lighting spectra, to implement RGB-based lighting for example. In some cases, the light source 105 can include spectra beyond RGB. Light sources 125 can be implemented as circuit boards, each circuit board including LED light sources 125 of distinct emission spectra. The circuit boards can be arranged in a spherical manner around an object to be illuminated (e.g., an actor) and can produce an omnidirectional lighting environment that is like a 360 panorama. With an omnidirectional system, for example system 100, complex lighting environments can be produced with different illumination spectra from different parts of the scene 102.

The LED light sources 125 of the circuit boards can be driven in accordance with intensity coefficients obtained using the capture systems and techniques described, which need not involve any explicit spectral measurements of any component of the system. Typically, when matching spectra of illuminants with a great level of detail, the emission spectrum of the LEDs 125, the spectral power distribution of the illuminant, the spectral sensitivity functions of a camera 110 (how much of a particular wavelength of light does the camera observe for each of its color channels), and also the reflectance across the visible wavelengths of the material that is being imaged (the reflectance spectra) should be determined. However, such explicit spectral measurements can be avoided by employing a multi-color reference object 115, shown as a color chart, as described. The reflectance spectra of the multi-color reference object 115 need not be known, in some cases, but the multi-color reference object 115 should be an arrangement of materials having diverse reflectance spectra. The disclosed techniques involve driving the LEDs 125 during lighting reproduction so that they illuminate a multi-color reference object 115 so that it appears similar to how it appeared when lit by the original lighting of scene 102.

When an original scene illuminant falls on this multi-color reference object, it can provide enough information about the illuminant that the illuminant can be effectively reproduced inside a lighting stage. A color chart 115 can be observed in the original environment, and the light sources 105 of the lighting stage 120, shown as the omnidirectional LED sphere, can be driven to reproduce the appearance of one or more color charts, possibly facing in different directions within the environment, closely matching their appearance as observed in the original illumination environment. In the lighting sphere 120, there can be hundreds (approximately 350) of LED light sources 105, and for each of these LED light sources comprised of multiple LED units 105 of distinct spectra, a version of the color chart 115 that would point toward that light source 105 from the captured real environment being reproduced can be determined, and the appearance of that color chart 115 can be closely matched for each light source 105. Thus, calibration of the system 100 can involve taking a separate photograph of the multicolor reference object 115 (e.g., the color chart) under each LED of distinct emission spectrum available in the system, so that the appearance of the multi-color reference object can be closely matched by the reproduced illumination in the lighting stage.

It should be noted that this not the same as a color balance process (e.g., multiplying three channels of an image in some linear combination). Here, no color correction or post-processing need be used. Rather, the LED intensities themselves can be driven to match the data captured in the environment. This can result in more degrees of freedom because, when a white balance is done, the scales of the red, green and blue channels of an image can be changed, but distinct parts of the spectrum are not controlled. Moreover, although a multi-color reference object 115 is referenced throughout as a color chart, it will be appreciated that no particular chart format is required. Rather, another multi-color reference object can be used, provided the reference object has materials/portions with different reflectance spectra to provide enough information for the process to work. Alternatives to a color chart include custom materials arrangements that contain materials of specific reflectance spectra where color rendition of such materials is critical (e.g. fabric or costuming materials, paint swatches, pigment mixtures, or cosmetic material swatches) or even arrangements that allow for the skin of a live actor to be photographed in tandem with other materials of diverse reflectance spectra.

In addition, different systems and techniques can be used to capture omnidirectional lighting information from the scene for which lighting is to be reproduced, which enables determination of what the color chart will look like illuminated by different angular sections of the environment around the sphere. One approach includes obtaining a fine grain angular resolution map of what a color chart looks like illuminated by a portion of the environment. This can involve enclosing the color chart with a cone of acceptance such that only light coming from parts of the scene will be shining on the color chart. A panorama pan-tilt rig system can be used with this enclosure to obtain detailed angular resolution of the scene illuminant as it lights the color chart. Another approach allows more rapid capture by taking a photograph that includes at least one mirror sphere so the camera records a panoramic image of the lighting environment, augmenting this observation with a photograph of at least one multi-color reference object placed in the scene. This second approach is faster than the first approach and can produce acceptable results.

FIG. 1 shows a set of objects 102 arranged in accordance with a fast multispectral lighting environment capture technique, discussed in detail in connection with FIG. 2. The set of objects 120 can be located remotely from the lighting stage 120 to capture any illumination environment that one might want to reproduce in the lighting stage. The fast multispectral lighting environment capture can be described as pointing a camera 110 in some cases with video capabilities at a mirror, or chrome, sphere 108 and possibly also a black sphere 104. The mirror sphere 108 can be augmented with observations of one or more color charts, such as the arrangement of five charts 115 that are facing in different directions (one facing the camera, and the others arranged at 45° angles up, down, left and right). This provides five different integrals of the illumination environment because the charts are facing different hemispheres of the scene recorded by the set of objects 120. In some cases, both the mirror sphere 108 and black sphere 108 are of a particular size (e.g., 8 cm). The spheres 104,108 can have the same size, or each having a different size from the other ball. Also, the spheres can have a particular reflectance. As an example, the mirror sphere 108 can be 57.5% reflective based on a reflectance measurement. And, the black sphere 104, which can be acrylic, can be 4% reflective of light at normal incidence, with the reflectance increasing significantly toward grazing angles in accordance with equations for a dielectric material. The black sphere 104 is used to increase the observable dynamic range of illumination. Also, the set of objects 102 can include a mounting assembly for this approach, having a beam constructed of a rigid material, for example aluminum, used to secure the camera 110 and its macro lens at a distance (e.g., 135 cm) away from the arrangement of spheres 104,108 and the color charts 115. Also, in some instances, the spheres 104, 108 can occlude each other from a set of side directions, thus the assembly can be oriented in a manner such that no major sources of illumination fall within these areas. In an implementation, two checkered fiducial markers can be used to further stabilize video footage of the set of objects 102, recorded using the spheres 104,108 and camera 110. In cases where the lighting is static within the scene recorded by the set of objects 102, the camera 110 can record a high dynamic range (HDR) exposure series and reconstruct the RGB lighting directly from the mirror sphere 108. In cases where the lighting is dynamic within the scene recorded by the set of objects 102, and requires recording in a single video frame, the camera 110 can be set at an exposure allowing for: indirect light from walls, ceiling, or sky to be exposed acceptably in the mirror sphere 108; light sources to be seen distinctly in the black sphere 104; and the two reflections to be combinable into an HDR map.

The camera 110 can be implemented as any suitable device, or collection of devices, capable of electronically recording, generating, or producing visual images. The camera 110 can include, but are not limited to: digital cameras; digital video cameras; imaging sensors; tablet computers; and various mobile computing devices with camera functionality (e.g., built-in cameras). FIG. 1 illustrates the camera 110 as being located outside of the lighting stage 120, proximately close to the arrangement of objects within 102 (at a short distance from the arranged color-chart 115 and spheres 104,108). However, it should be appreciated that one or multiple cameras can be used to capture a collection of images to capture a record of the scene illumination environment. Moreover, in some instances, system 100 can include another camera 150 used to capture photographs of the chart 115 appearance as illuminated by each LED of distinct spectra inside the light stage 120. However, it should be appreciated that although camera 150 can be used for capturing images of a subject in lighting reproduction, there are instances where camera 150 is not needed (e.g., lighting reproduction with no camera). For instance, camera 150 is optionally present in the case of reproducing illumination to appear correct for a human observer.

FIG. 1 also shows a computer 140 that includes a processor 142 and a memory 144, and the computer 140 can be connected to a computer network 130, which can be a private network, a public network, a virtual private network, etc. The computer network 130 can be implemented as either a wired network (e.g., Ethernet) or a wireless network. The devices of system 100, including the various components of the light stage 120 and computer 140, can be connected via network 130. Examples of computer networks include, but are not limited to, a local area network (LAN), a wide area network (WAN), and the Internet. As shown in FIG. 1, the computer network 130 is a wired network so that the components of the lighting stage 120, such as the light sources 105, can communicate, or otherwise transmit, data via an interface to one or more components thereof using physical connections such as Universal Serial Bus (USB) connectors. Additionally, or alternatively, the devices can utilize a direct physical connection that does not necessitate using the network 130. In some implementations, computer network 130 can be a wireless local area network (WLAN), such as an IEEE 802.n network. Thus, lighting stage 120 and computer 140, for example, are communicatively coupled, and capable of wireless transmission of data via the computer network 130.

The processor 142 can be one or more hardware processors, which can each include multiple processor cores. The memory 144 can include both volatile and non-volatile memory, such as Random Access Memory (RAM) and Flash RAM. The computer 140 can include various types of computer storage media and devices, which can include the memory 144, to store instructions of programs that run on the processor 142.

Such programs can include Multispectral Lighting Reproduction Software 146, which can run locally on computer 140, remotely on a computer of one or more remote computer systems (e.g., in a third party provider's server system accessible by the computer 140 via the network 135), or on a combination of one or more of each of the preceding. The Multispectral Lighting Reproduction Software 146 can present a user interface (UI) employed for displaying related information, such as controls, calculations, and images on a display device 145 of the computer 140. The display device 145 can be operated using one or more input devices 148 of the computer 140 (e.g., keyboard and mouse or touch screen). Note that while shown as separate devices in FIG. 1, the display device 145 and/or input devices 148 can also be integrated with each other and/or with the computer 140, such as in a tablet computer.

The Multispectral Lighting Reproduction Software 146 is configured to analyze, process, and manipulate data that is generated by the multispectral lighting reproduction techniques of the embodiments. The Multispectral Lighting Reproduction Software 146 can implement various aspects used for performing analysis of multispectral illumination. As an example, the Multispectral Lighting Reproduction Software 146 can be implemented to automatically compute, select, estimate, or control various facets of the disclosed multispectral light reproduction approaches, such as the functions needed for photographing color charts under different LED lights, computing the intensities for each LED unit 125 in system 100, driving the light sources using these intensities, etc. Also, the Multispectral Lighting Reproduction Software 146 can optionally also implement various aspects of photography and video capabilities of the system 100. In some cases, camera control is not automated, or otherwise performed by computer 140. For instance, a camera operator, such as a photographer, can control the camera 110 to perform the photography aspects of the techniques, while the computer 140 controls the light sources 105. In some implementations, Multispectral Lighting Reproduction Software 146 is programmed to effectuate movement of any electro-mechanical components needed to appropriately adjust the assemblies and lighting for performing the disclosed techniques.

Figure 2A:
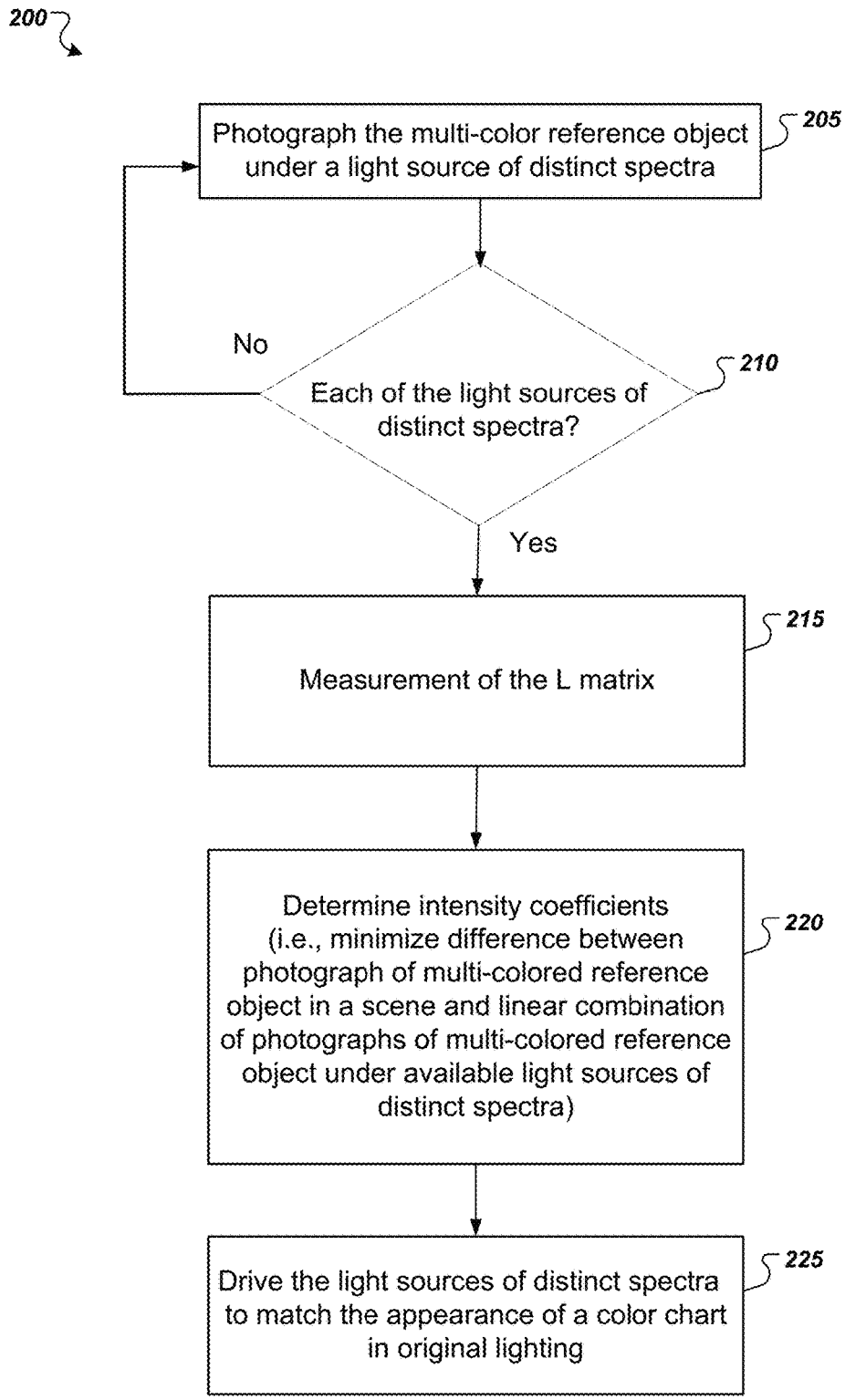
FIG. 2A shows a block diagram of an example of a process for implementing a disclosed multispectral lighting reproduction approach including driving the multispectral lights with a color chart.

FIG. 2A shows a block diagram of an example of a process 200 for implementing a disclosed multispectral lighting reproduction approach including driving the multi-spectral lights with photographs captured of one or more color charts. The disclosed process 200 can be utilized to drive intensities of light sources having different light spectra, for instance arrangements of LEDs, to accurately reproduce the effects of real-world illumination environments with any number of spectrally distinct illuminants in a scene. The directness of process 200, namely using one or more observations of a color chart reflecting different directions of the illumination in the environment, realizes advantages associated with precluding the need for explicit spectroradiometer measurements of the illumination. Furthermore, LED intensities can be driven directly from the color chart observations in process 200, without requiring an explicit estimation of the illuminant spectra, and without knowledge of the reflectance spectra of the color chart samples, the emission spectra of LEDs, or the spectral sensitivity functions of the cameras involved.

The process 200 begins with photographing 205 the multi-color reference object, for example a color chart, under one of the different light spectra included in a light source. As a general description, photographing, in 205, serves as input data to solving the problem of reproducing the appearance of a color-chart to a given camera in a particular lighting environment using a multi-spectral light source. A check is performed at 210, to determine whether a photograph of the color chart has been taken as lit under each of the distinct spectra in the light source, respectively. As an example according to the RGBCAW implementation, the process 200 photographs 205 a color chart illuminated by the red LEDs. Then, the process 200 can iteratively photograph 205 the same color chart as individually lit by the green, blue, cyan, amber, and white LEDs respectively. In the case that a photograph has not been taken for each of the LED spectra (i.e., No), the process 200 repeats and takes another photograph under a different LED spectra of the light source. At 205, photographing the color chart with the camera, implemented as a RGB camera for example, produces pixel values $P_{ij}$ where i is the index of the given color chart patch and is the camera's $j^{th}$ color channel. Because light is linear, the superposition principle states that the chart's appearance to the camera under the multispectral light source will be a linear combination of its appearance under each of the spectrally distinct LED's. Thus, the basis for every way the chart can appear can be recorded by photographing the chart lit by each of the LED spectra at unit intensity. If it is determined that photographs corresponding to each of the LED spectra in the light source have been taken (i.e., Yes), the process 200 proceeds to measuring 215 the L matrix.

Measuring in 215 can involve constructing a matrix L, where $L_{ijk}$ is the averaged pixel value of color chart square i for camera color channel j under LED spectrum k. To achieve even lighting, this is accomplished using the full sphere of LED lights sources (shown in FIG. 1) of a given spectrum simultaneously, though a single multispectral light could be used in some instances. L is mathematically represented as an ij×k matrix whose columns to the LED spectrum k and whose rows unroll the indices i and j to place the RGB pixel values for all chart squares in the same column.

To reproduce the color chart appearance, the process 200 then determines 220 the intensity coefficients, by minimizing the difference between a photograph of the multi-color reference object in a scene, and linear combination of photographs of the multi-color reference object under available light sources of distinct spectra. Determining 220 for the LED intensity coefficients $\alpha_k$ can involve solving for the coefficients that minimize Eq. 1, which is the difference between the original color chart appearance under a desired scene illuminant and the color chart under the reproduced illumination:

$$\sum_{i=1}^{m}\sum_{j=1}^{3}\left(P_{ij} - \sum_{k=1}^{n} \alpha_k L_{ijk}\right)^2 = \|P - L\alpha\|^2 \quad (1)$$

where m is the number of color chart patches, and n is the number of different LED spectra.

In cases where the scene illuminant spectrum is unknown, the unknown is represented mathematically as I(λ), the color chart spectral reflectance functions is $R_i(\lambda)$, and the camera spectral sensitivity functions is $C_j(\lambda)$. The pixel value can be represented mathematically as:

$$P_{ij} = \int_\lambda I(\lambda) R_i(\lambda) C_j(\lambda) \quad (2)$$

If the emission spectrum of LED k is defined as $I_k(\lambda)$ and each LED is driven to a basis weight intensity of $\alpha_k$, the reproduced appearance of the chart patches under the multispectral light can be represented as:

$$P_{ij} \approx \int_\lambda \left[\sum_{k=1}^{n} \alpha_k I_k(\lambda)\right] R_i(\lambda) C_j(\lambda) \quad (3)$$

Since αk does not depend on λ, pulling the summation out of the integral simplifies to the appearance of the color chart patches under each of the basis LED spectra $L_{ijk}$ and can be expressed as:

$$P_{ij} \approx \sum_{k=1}^{n} \alpha_k \int_\lambda I_k(\lambda) R_i(\lambda) C_j(\lambda) = \sum_{k=1}^{n} \alpha_k L_{ijk} \quad (4)$$

Thus, the necessary characteristics of the spectra of the illumination, color chart patches, LEDs, and camera sensitives are measured directly by photographs of the color chart (e.g., without explicit measurement spectral measurements). As more LED sources of distinct spectra are added, the reproduced illumination, represented as $$\sum_{k=1}^{n} \alpha_k I_k(\lambda)$$

may be better approximated as the original illuminant I(λ).

In some implementations, determining 220 the LED intensities $\alpha_k$ that minimize Eq. 1 uses the linear least squares (LLS) algorithm. In some cases, using LLS can lead to negative weights for some of the LED colors, which is not physically realizable. However, simulating such illumination by taking two photographs, one where the positively-weighted LEDs are turned on, and a second where the absolute values of the negatively-weighted LEDs are turned on, and subtracting the pixel values of the second image from the first can be performed. This approach can be appropriately applied in cases where the camera takes these two images quickly. In some implementations, determining 220 the light intensity coefficients, or the LED intensity weights, uses nonnegative least squares (NNLS) algorithm. In this case, NNLS can be employed to increase potential of avoiding the negative weights complication (and facilitate motion picture recording), yielding an optimal solution where the lighting can be reproduced all at once and captured in a single photograph or video frame.

Thereafter, the process 200 utilizes the determined light intensity coefficients to drive 225 the multispectral lights using the color chart observations. That is, driving the light sources of distinct spectra match the appearance of a color chart in the original lighting. Driving 225 includes causing the LED spectra to reproduce the appearance of the color chart under the reproduced illumination in the LED sphere.

Figure 2B:
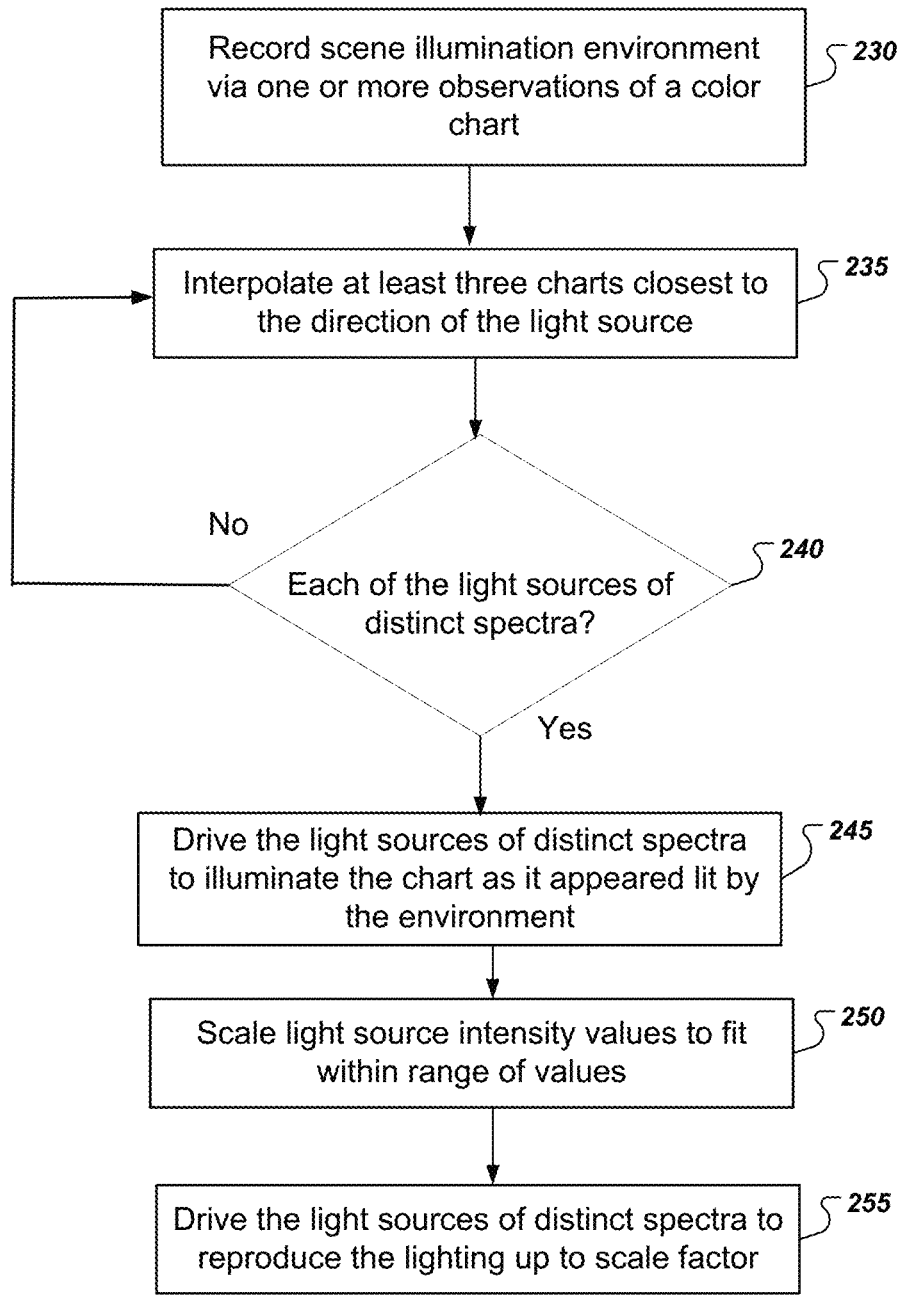
FIG. 2B shows a block diagram of an example of a process for implementing a disclosed multispectral lighting reproduction approach including lighting a subject with a color chart panorama.

FIG. 2B shows a block diagram of an example of a process 201 for implementing a disclosed multispectral lighting reproduction approach including lighting a subject with a color chart panorama. The process 201 begins by recording 230 scene illumination using observations of a color chart facing one or more directions, resulting in photographs of the color chart when illuminated by different angular sections of the illumination environment. In some cases, real lighting environments can have a variety of illuminant spectra, with indirect light from numerous materials modulating these spectra. A color chart, lit by an entire hemisphere of light, can lack the angular discrimination needed to record the detailed directional effects of such illumination. Thus, the process 201 includes capture of the lighting environment within the entire scene. In accordance with the techniques disclosed, recording scene illumination can include using two assemblies for capturing multispectral lighting environments; one acquires unique spectral signatures for each lighting direction, and the other allows for video rate acquisition. Use of either of the two assemblies can be associated with various design tradeoffs, for instance trading spectral angular resolution for speed of capture.

Figure 3A:
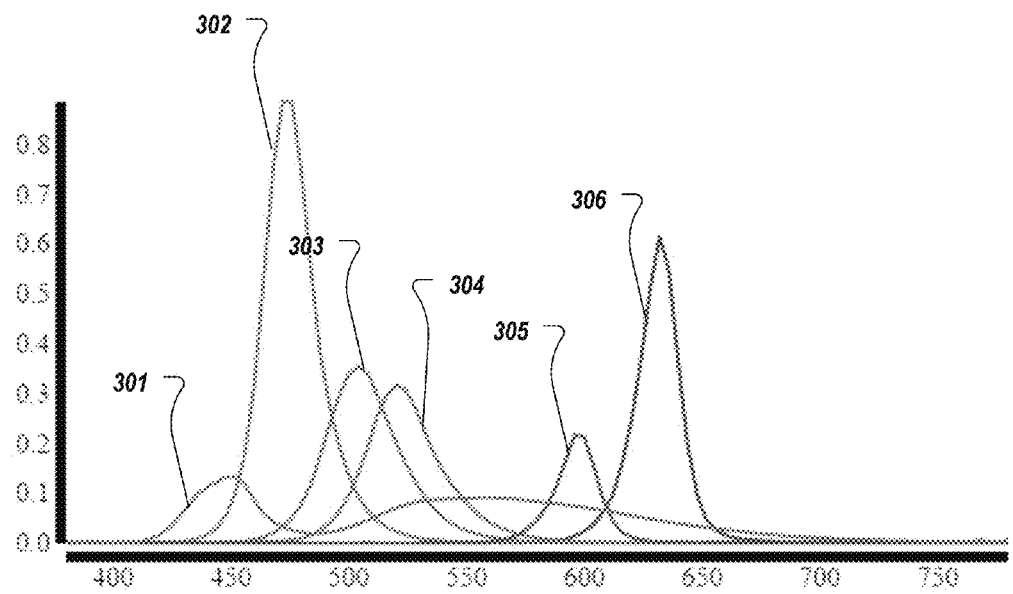
FIG. 3A shows a graph of various lighting spectra utilized for illumination in the multispectral lighting reproduction approaches.
Figure 3B:
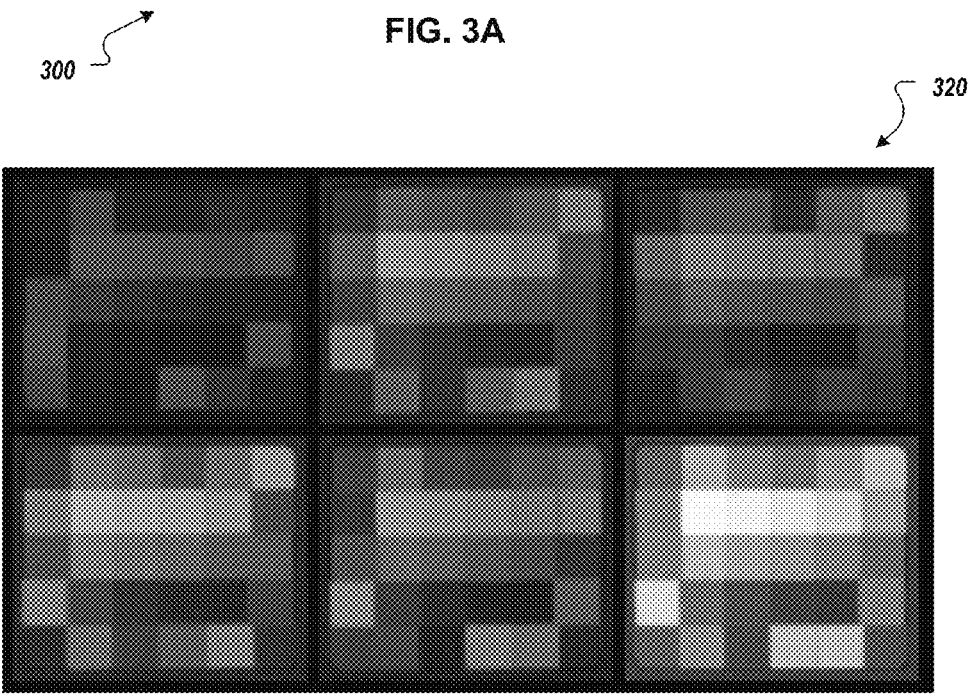
FIG. 3B shows an example of a multi-color reference object (e.g., color chart) illuminated by the various lighting spectra in the multispectral lighting reproduction approaches.
Figure 3C:
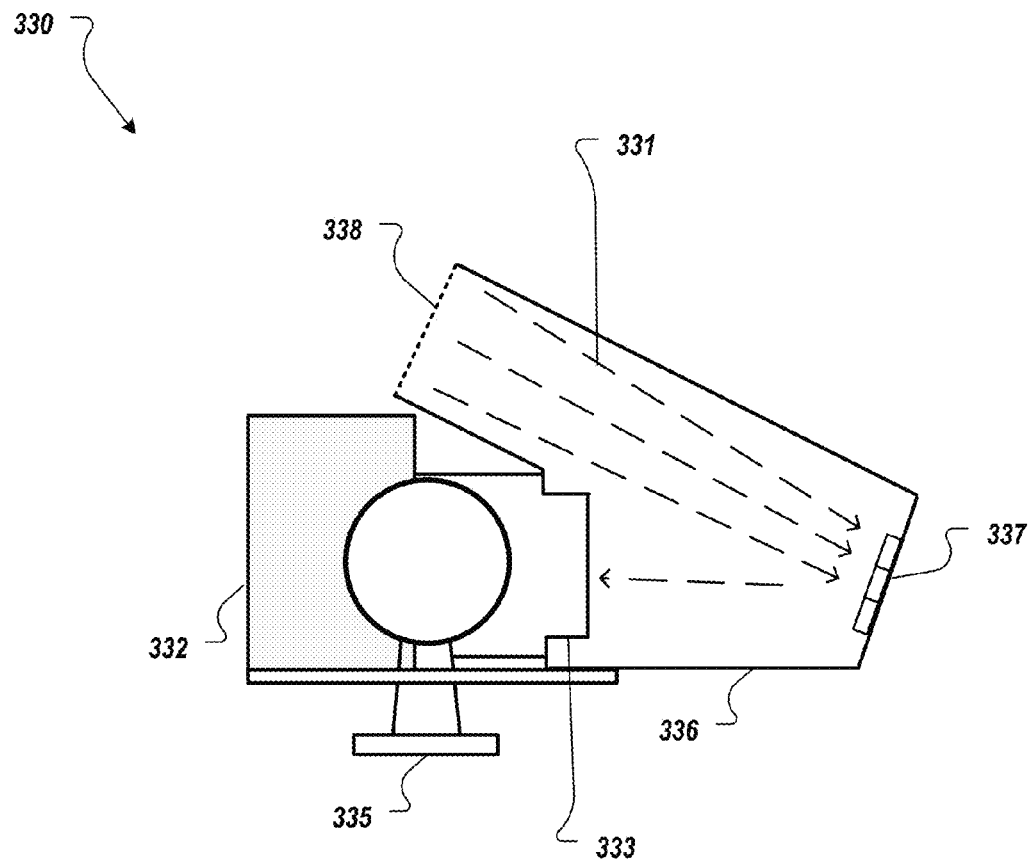
FIG. 3C shows an assembly utilized to capture an omnidirectional multispectral lighting environment.

Recording in 230 involves the aforementioned first assembly, discussed in greater detail in reference to FIG. 3C. Also, as discussed in reference to FIG. 2A, the multispectral LED source can be driven to match the appearance of the color chart. Moreover, measuring how each section of the lighting environment, at about the resolution of the LED sphere, illuminates a color chart, allows for creating an interpolated chart for the light. Accordingly, the process 201 proceeds to interpolating 235 at least three nearest charts to the precise direction of the light to create an interpolated chart P for that light. The process 201 performs interpolation for each light source, therefore a check is performed at 240 to determine whether the chart's appearance is estimated for each of the light sources of distinct spectra. In not (i.e., No) the process returns to 235 interpolating for each light source. In the case that an interpolation has been created for each light source (i.e., Yes), the process 201 continues to drive 245 the light sources of distinct spectra, for example the LEDs in the light source, so that it illuminates the chart to appear as it appeared when lit by the corresponding section of the environment. As a result, driving 245 the light sources causes the lighting stage to create varying LED intensities through pulse-width modulation (PWM), for example, using 12 bits of lighting input to achieve possible intensity values. As an example, 4K possible intensity values can be created.

Thereafter, the process 201 performs scaling 250 the light source intensity values to fit within range values. Scaling 250 can also scale the overall brightness of the lighting environment so that all of the LED intensity values fit within a range. Next, driving 255 the LED spectra to reproduce the lighting environment up to the aforementioned scaling factor.

Figure 2C:
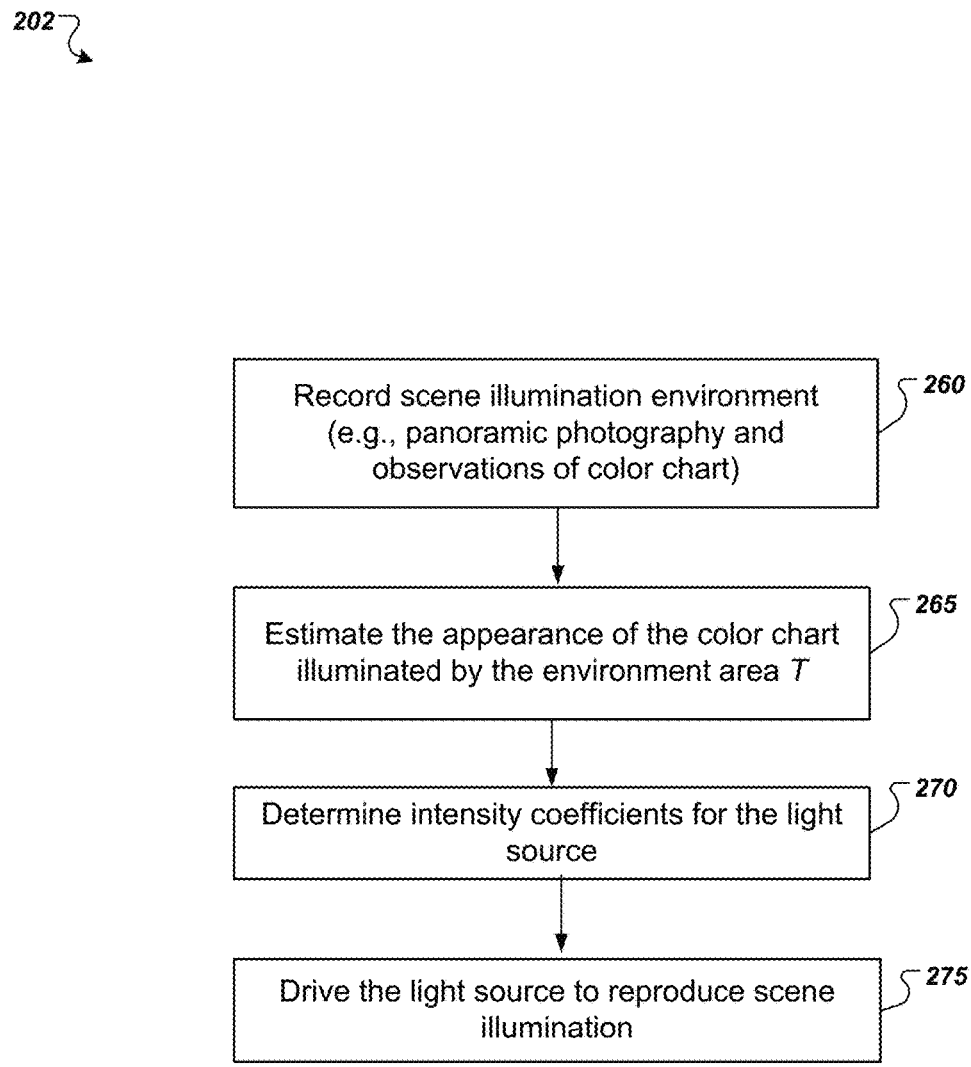
FIG. 2C shows a block diagram of an example of a process for implementing a disclosed multispectral lighting reproduction approach including augmenting panoramic imagery with color charts.

FIG. 2C shows a block diagram of an example of a process 202 for implementing a disclosed multispectral lighting reproduction approach including augmenting panoramic imagery with color chart observations. Techniques involving recording a lighting environment with the aforementioned first assembly can take longer than some existing HDRI lighting capture techniques such as photographing a mirrored sphere or acquiring and stitching HDR fisheye photographs. Thus, process 202 involves promoting a high-resolution RGB HDRI map to a multispectral HDRI map using a sparse set of color chart observations. Process 202 begins with recording 260 a scene illumination environment, for example using panoramic photography techniques and observations of one or more color charts placed in the scene. Then, process 202 estimates 265 the appearance of color charts reflecting the light from certain directions of the lighting environment.

In some cases, one light source can be responsible for reproducing the illumination from a particular set of pixels T in the RGB HDR panorama, and the average pixel value of this area can be represented as $Q_j$ (where j indicates the color channel). Q's three color channels (e.g., RGB) can potentially not provide enough information to drive the multispectral light source, because there is no direct observation of the appearance of the color chart lit by the corresponding particular part of the environment T. Thus, the process 202 performs an estimation 265 of an appearance of a color chart $P_{ij}$ as its lit by the same general area of the environment T, as it is considered to be reflecting an overall illuminant $I(\lambda)$ corresponding to our environment area T.

The estimation in 265 can be performed using the sampling of color charts available. If only one color chart is placed in the scene, it can be used as the starting point for the estimation. If multiple charts are placed in the scene, three or more color chart observations can be interpolated to create an interpolated chart appearance for a particular part of the lighting environment. As an example, three sets of the nearest lighting data from among the photographs taken of the color chart at different angular sections of the illumination environment are selected for the interpolation.

Using the spectral camera model of Eq. 2, where $R_i(\lambda)$ is the spectral reflectance function of patch i of the color chart and $C_j(\lambda)$ is the spectral sensitivity function of the $j^{th}$ color channel of the camera, the color chart can include a spectrally flat neutral square, such as white, which is presumed to be the zeroth index patch $R_0(\lambda)=1$. In some cases, $P_0$ can be scaled up to account for the case where the white patch can be 90% reflective. This patch reflects the illumination falling on the color chart, as seen by the camera, which yields the RGB pixel observation Q, corresponding to the observed color of that section of the environment. As a general description, since the illuminant estimate $I(\lambda)$ corresponds to a larger area of the environment than T, Q will not be equal to $P_0$. For example, if T covers an area of foliage, for instance, modulating $I(\lambda)$ by spectral reflectance $S(\lambda)$, and the illuminant I broadly accounts for the incident daylight, the pixel observation can be represented as:

$$Q_j = \int_\lambda I(\lambda) S(\lambda) C_j(\lambda)$$

Estimating 265 the appearance of a color chart $P'_{ij}$ illuminated by the environment area T considers how the modulated illuminant $I(\lambda)S(\lambda)$ would illuminate the color chart squares $R_i(\lambda)$, and can be mathematically represented as:

$$P'_{ij} = \int_\lambda I(\lambda) S(\lambda) R_i(\lambda) C_j(\lambda)$$

In some cases, the spectral reflectance $S(\lambda)$ is unknown, but the environmental reflectance functions can be characterized as generally smooth, whereas illuminant spectra can have higher frequency spikes. If it is assumed that $S(\lambda)$ is approximately equal to $s_j$ over each camera sensitivity function $C_j(\lambda)$, the estimation can be represented as:

$$P'_{ij} = \bar{s}_j \int_\lambda I(\lambda) R_i(\lambda) C_j(\lambda)$$

Thus, as $P'_{ij} = s_j * P_{ij}$ and since $R_0(\lambda)=1$, then estimation can be represented as:

$$P'_{0j} = \bar{s}_j \int_\lambda I(\lambda) C_j(\lambda) = Q_j$$

Consequently, since $s_j = Q_j/P_{0j}$, it can be further computed that $P'_{ij} = Q_j * P_{ij}/P_{0j}$. That is, estimating in 265 can be described as involving dividing the interpolated color chart P by its white square, and then recoloring the whole chart so that it appears to be lit by an illuminant of the same color as the observed RGB pixel value Q for the section of the HDRI map, to arrive at the estimate P' for a color chart illuminated by T. This recolored chart is consistent with the observation Q and retains the same relative intensities within each color channel of the estimated illuminant falling on the interpolated chart patches. In cases where the camera spectral response functions were known, then is can be possible to estimate $S(\lambda)$ more accurately than as a constant per color channel.

Next, the process 202 determines 270 lighting intensity coefficients from the color chart appearance estimation using the approach outlined in FIG. 2A. The process 202 utilizes the determined light intensity coefficients to drive 275 the multispectral LED lights so that they best illuminate the virtual color chart with the estimated appearance, in order to reproduce the lighting environment.

Figure 2D:
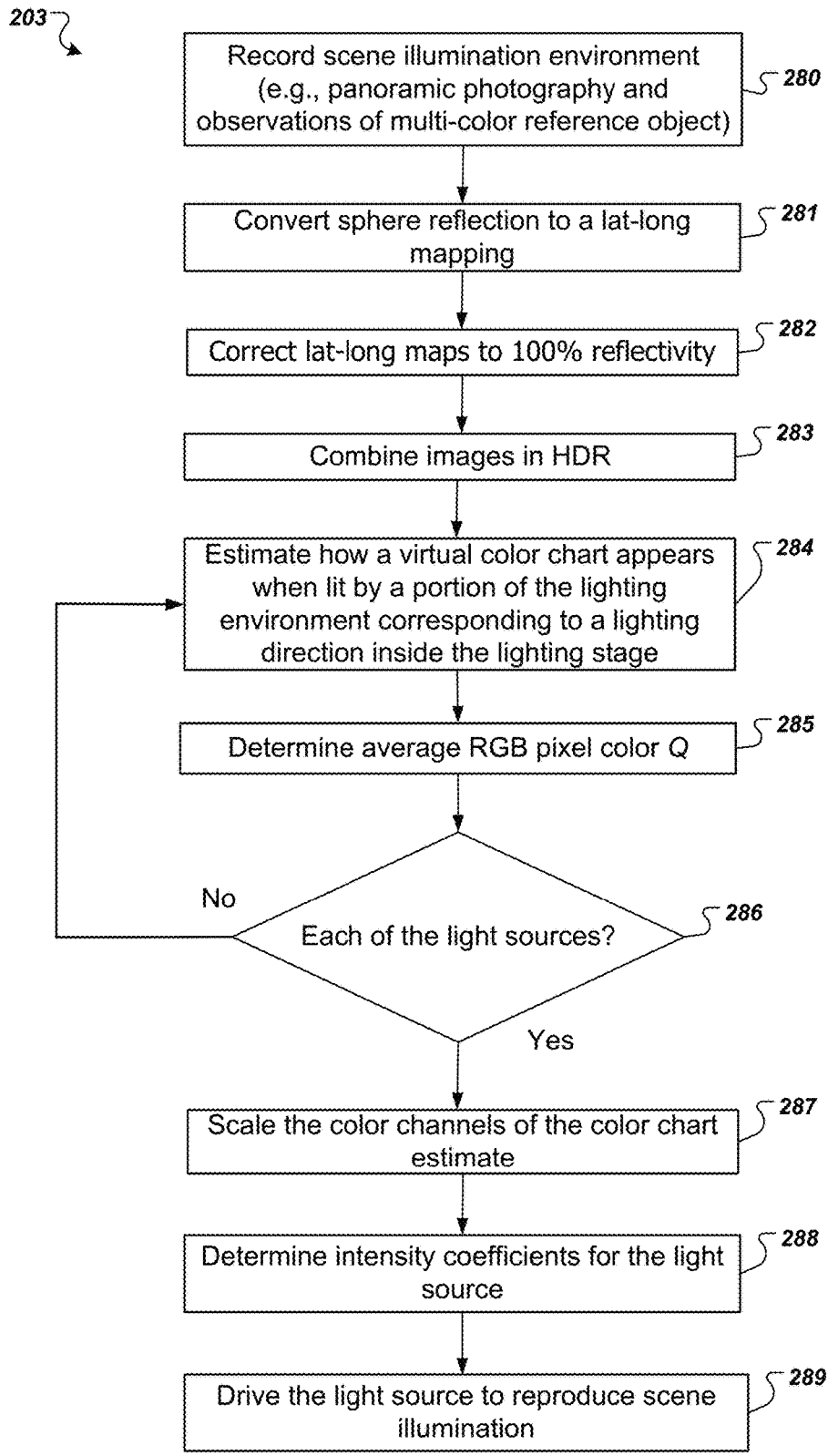
FIG. 2D shows a block diagram of an example of a process for implementing a disclosed multispectral lighting reproduction approach including fast multispectral lighting environment capture.

FIG. 2D shows a block diagram of an example of a process 203 for implementing a disclosed multispectral lighting reproduction approach including fast multispectral lighting environment capture. Process 203 involves an implementation where, recording 280 the scene illumination environment includes use of the aforementioned second assembly. The second assembly allows for video rate acquisition of the scene's illumination environment. Recording even a sparse set of color chart observations using the pan/tilt technique is relatively slow as compared to capturing an RGB HDR panorama. In instances where the scene is expected to comprise principally one illuminant, such as daylight, it can be possible to promote the entire high dynamic range imaging (HDRI) map to multispectral color information using a photograph of a single color chart to comprise every color chart estimate P'. However, in the case of scenes with mixed illumination sources, it can be desirable to record at least some of the angular variation of the illumination spectra, and a faster multispectral illumination environment capture may be deemed suitable. Accordingly, a video rate capture assembly can be utilized in recording 280 the scene illumination environment.

Recording 280 using the second assembly, namely a fast multispectral lighting capture system, can involve pointing a camera with video capabilities at a mirrored, or chrome, sphere and a black sphere (shown in FIG. 1). In cases where the lighting is dynamic, and requires recording in a single shot, the camera can be set at an exposure allowing for: indirect light from walls, ceiling, or sky to be exposed acceptably in the chrome sphere; light sources to be seen distinctly in the black sphere; and the two reflections to be combinable into an HDR map. To construct the HDRI map, each of the sphere's reflections are first converted 281 into a latitude-longitude mapping. Since the spheres are at a designated distance apart from each other (e.g., 3°), with respect to the camera, one sphere's lat-long image (e.g., black sphere image) can be shifted to rotate it into alignment with the other sphere's image (e.g., mirrored sphere image).

Thereafter, the lat-long maps, which are the maps resulting from the chrome sphere and the black sphere, are corrected in 282 to 100% reflectivity before combining 283 their images in HDR. For the black sphere, this can involve dividing by the angularly-varying reflectivity, resulting from a Fresnel gain, for example. The angularly-varying reflectivity of the two spheres can be measured in a dark room, moving a diffuse light box to a range of angles incident upon the sphere, allowing a Fresnel curve with a particular index of refraction (e.g., 1.51) to produce the corrective map. Since the dielectric reflection of the black sphere depends on the light's polarization, using the black sphere image can be deemed inappropriate with reconstructing some environment illuminants, such as daylight. In either of the static or dynamic case, a scene including bright environmental light sources (e.g., the sun) can cause saturation of the exposures. Thus, correcting 282 can involve reconstructing their RGB intensities indirectly from the more neutral colored squares of the color charts (e.g., grey), using a single-shot light probe technique, for example. Other dynamic RGB HDR lighting capture techniques can be applied as deemed necessary or appropriate. For instance, HDRI lighting capture techniques can include acquiring HDR fisheye lens photographs.

Thereafter, the process 203 performs estimating 284 how a virtual color chart P' would appear as lit by the portion of the lighting environment which will be represented by a multispectral light source in the lighting stage.

Estimating 284 can include taking the assembled RGB HDR lighting environment and promoting it to the multispectral record of the environment using a color chart arrangement, for instance five color charts (shown in FIG. 1). In this example, estimating 284 includes an estimation of, for each of the LEDs, how a virtual color chart P' would appear lit by a portion of the lighting environment represented by a multispectral light source in the lighting stage. A chart which points backwards in the scene is not physically feasible in some cases. Thus a back-wards facing color chart $P_6$ may be postulated as the average of the observed color charts, such as the five color charts $P_1 \ldots P_5$.

To determine this estimation for P', first P is computed for each light source in the lighting stage as via interpolation from the available color chart observations in the environment. Subsequently, for each light, the average RGB pixel color Q of the HDR lighting environment area corresponding to the light source is determined in 285. The process performs estimating 284 and determining 285 for each light source, thus a check is performed at 286 to determine whether all each of the light sources have been processed. If so (i.e., Yes), the process 203 then, using the estimation, scales 287 the color channels of the color chart estimates P to form P' estimates that are consistent with Q. Otherwise, the process 203 repeats estimating 284 and determining 285 for each light source.

Next, the process 203 determines 288 the intensity coefficients for the light source by solving for the LED intensities which best reproduce the appearance of the color chart P'. In some cases, the technique for determining the intensity coefficients as discussed in reference to FIG. 2A is also applied in determining 288 the intensity coefficients in process 203. Subsequently, the process 203 can drive 289 the light source to reproduce the original lighting, using the intensity coefficients. In some cases, driving 289 can involve effectuating the multispectral light stage to reproduce the spectrally complex illumination effects of real-world lighting environments to capture imagery of a subject illuminated within the stage.

FIG. 3A shows a graph 300 of various lighting spectra of a light source utilized for illumination in the multispectral lighting reproduction approaches. The color chart's L matrix can be recorded—its appearance when illuminated by each of the available LEDs of distinct spectra to one or more cameras, producing the images shown in FIG. 3B. That is, FIG. 3B shows examples 320 of images of an example of a color chart illuminated by the red, green, blue, cyan, amber and white LEDS, allowing measurement of the L matrix.

Further according to the example, FIG. 3A illustrates behavior of the illumination spectra of the six LED in each light source of the LED sphere. FIG. 3A shows graphical representations of the spectral power distribution of the six light spectra in accordance with the above technique. As shown, the graph represents the power per unit wavelength of the light spectra, namely white 301, blue 302, cyan 303, green 304, amber 305, and red 306.

FIG. 3C shows an assembly 330 utilized to capture an omnidirectional multispectral lighting environment. In an implementation involving the aforementioned first assembly, recording the scene illumination can be implemented using a black paper enclosure 336 to allow only a narrow cone of light 331 to fall on the color chart 337, and secure it in front of a camera 332, for instance a digital single-lens reflex (DSLR) camera having a lens 333. A particular width of the cone can be designated to substantially match the angular resolution of the lighting stage, which has light sources spaced at a certain angle (e.g., 12°) apart around its equator. The aperture of the enclosure is covered with three sheets of 5-degree light-shaping diffuser 338, to anti-alias the incident light.

According to the implementation, to capture an omnidirectional multispectral lighting environment (shown in FIG. 1), the camera 332 is placed with the color chart box 337 on a pan/tilt rig 335. The pan/tilt rig 335 can have the capability of programmable movement, thus allowing the rig to be programmed to record the spherical environment (360° environment) as a set of 30 horizontal by 24 vertical directions, which can match the angular resolution of the lighting stage, for example. As the chart 337 becomes illuminated when pointed towards the light source, the camera 332 can be placed at a setting allowing the shutter speed to be automatically chosen to expose the color chart properly at each position, for instance an aperture-priority (Av) mode. In some cases, the shutter speed can be recorded in each image's metadata. Pixel values of chart patches under fixed lighting for a range of shutter speeds can be graphed in some cases. Also, in some cases, the viewfinder can be covered to prevent stray light from reaching the light meter. Recording using the assembly 330 can require longer capture times (as compared to the second assembly approach). As an example, capturing such images can take approximately an hour.

Figure 4A:
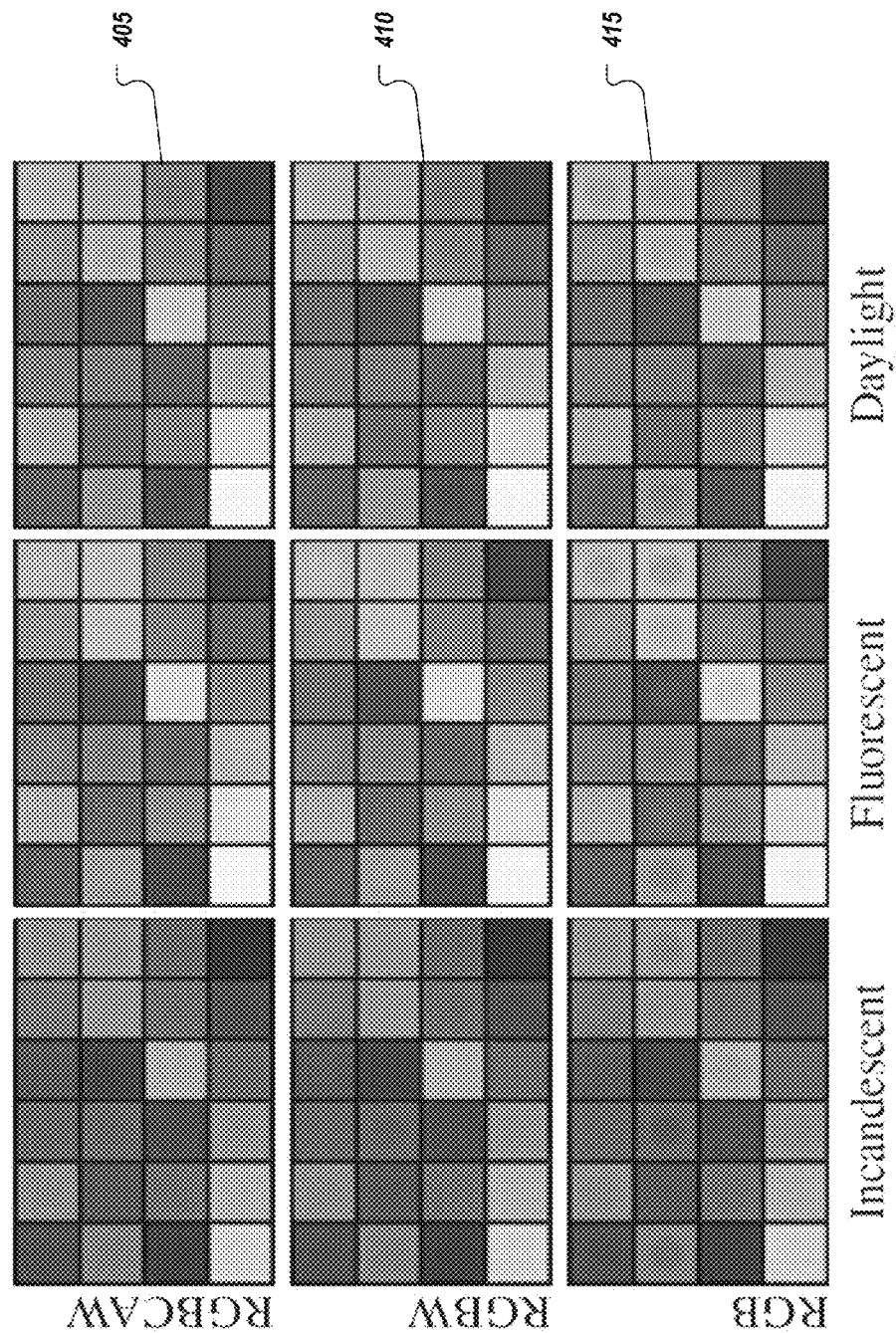
FIG. 4A shows examples of the appearance of a multi-color reference object (e.g., a color chart) as illuminated by several real-world illuminants, as compared with its appearance when illuminated using the multispectral lighting reproduction techniques with the reproduced illumination having various spectral channels.

FIG. 4A shows examples of multi-color reference objects (e.g., color charts) for reproduced illuminants having various spectral channels. The background squares of the top row 405 of FIG. 4A show the photographed appearance of the color chart under three real-world illuminants (i.e., incandescent, fluorescent, and daylight), while the foreground circles inside of the squares show the appearance under the nonnegative least squares solve using lighting reproduction generated with six spectral channels of LEDs (RGBCAW), for comparison. When the foreground circles fade into the background squares, it indicates that the solving yields color charts appearances that are substantially similar for RGBCAW solves, the circles are difficult to see at all. The middle row 410 shows the results of reproducing the illumination with four LED spectra (RGBW). The bottom row 415 shows the results of reproducing the illumination with three LED spectra (RGB). FIG. 4A serves to illustrate that the RGBW matches are substantially close, but the RGB matches are generally not close (comparative to RGBCAW), producing colors that can appear oversaturated that are easily distinguishable from the original appearance. Nonetheless, the approach can be used to drive only RGB LEDs to produce the best color rendition possible, despite the color rendition superiority demonstrated when using RGBW and RGBCAW light sources.

Figure 4B:
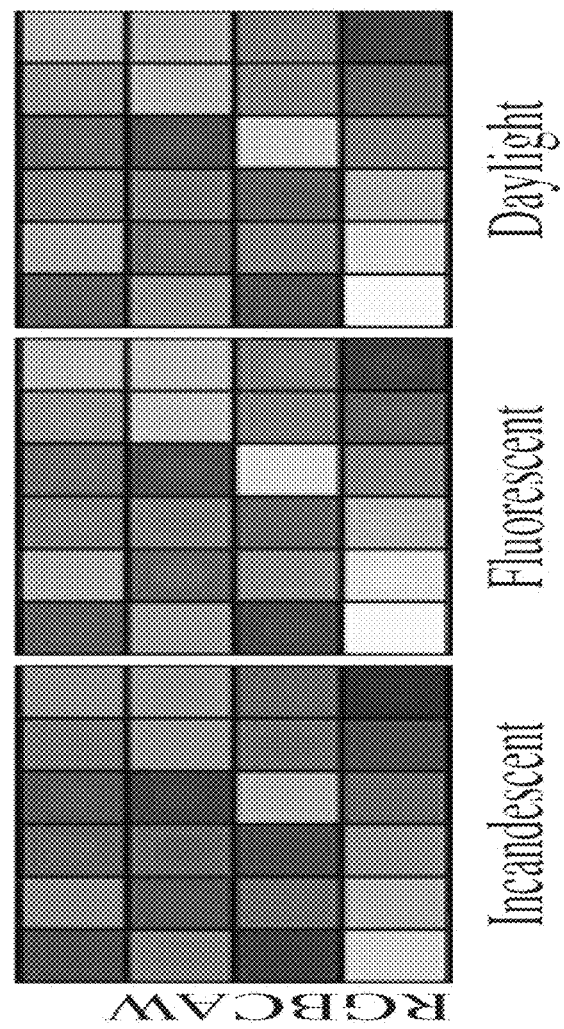
FIG. 4B shows an example of the appearance of a multi-color reference object (e.g., color chart) as illuminated by several real-world illuminants as photographed by a first camera, as compared with its appearance when illuminated using the multispectral lighting reproduction techniques with the reproduction result photographed using a second camera.

In some cases, cameras with different spectral sensitivity functions can be used to record the environment lighting and the reproduced illumination inside the lighting stage respectively, and the solving process can be employed to find LED intensities that reproduce the chart's appearance when using multiple cameras for capturing. FIG. 4B shows an example of a color chart 420 photographed under different illuminants (i.e., incandescent, fluorescent, and daylight) with different cameras, such as two DSLR cameras (made by different manufacturers and potentially having different spectral sensitivity functions). For instance, FIG. 4B displays the charts 420 as photographed with a first camera (background squares) under three real-world illuminants, with the lighting reproduced in the LED sphere photographed by a second camera (foreground circles). In this scenario, reproduced illumination is calculated from an L matrix using data captured by the second camera. Images in FIG. 4B intend to convey that, despite different sensitivities, the matches are reasonably close, with the most noticeable discrepancies in the blue and purple squares under fluorescent illumination. In the case that both cameras are available to photograph the color chart in the target illumination, applying a lighting-specific 3×3 color transfer matrix first can further improve the match.

Figure 5:
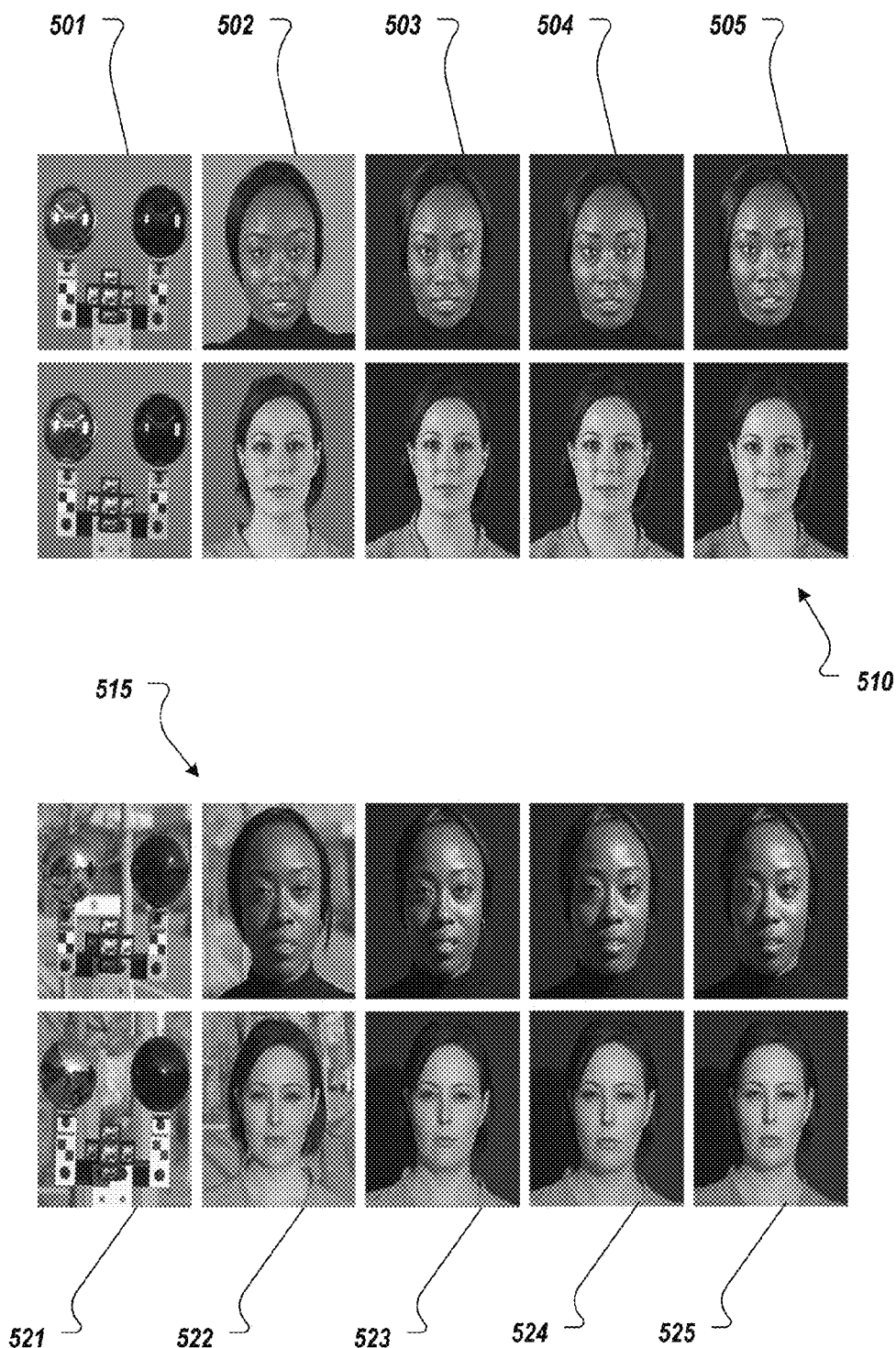
FIG. 5 shows examples of images captured using various lighting reproduction techniques for comparison with images captured in real-world illumination environments.

FIG. 5 shows examples of images captured using various lighting reproduction techniques in various illumination environments. FIG. 5 serves to illustrate the comparison between various lighting reproduction results to photographs of subjects in the original lighting environments. The images show recorded illumination 501, 521 (i.e., mirrored sphere and black sphere and color chart observations), and photographs of two subjects in various lighting environments captured in the original lighting 502,522 and photographs of the subjects captured using three different lighting reproduction techniques, namely: RGBCAW reproduction 503, 523; RGBW reproduction 504,524; and RGB reproduction 505,525. Although FIG. 5 shows human subjects, it should be appreciated that the lighting reproduction techniques described can produce appearance matches for a variety of objects, such as color charts, a still life scene, and can be extended to real-time multispectral lighting capture and playback.

In the photographs resulting from lighting reproduction, a black foam core board was placed 1 m behind the subject in a lighting stage for a neutral background. The subjects were photographed in RAW mode on a Canon 1DX DSLR camera and no image-specific color correction was performed. To create printable images, all raw RGB pixel values were transformed to RGB color space using the 3×3 color matrix [1.879, −0.879, 0.006; −0.228, 1.578, −0.331; 0.039, −0.696, 1.632], which boosts color saturation to account for the spectral overlap of the sensor filters. Finally, a single brightness scaling factor was applied equally to all three color channels of each image to account for the brightness variation between the real and reproduced illumination and the variations in shutter speed, aperture, and ISO settings.

FIG. 5 shows images of two subjects in indoor 510 and sunlight 515 lighting environments. The indoor 510 environment resulting in the images shown included an incandescent soft box light and spectrally distinct blue-gelled white LED light panels, with fluorescent office lighting in the ceiling. The lighting environment 515 was recorded using the fast capture techniques, as discussed in detail in reference to FIG. 2, and the subject was photographed in the same environment. Later, in the LED sphere, the lighting was reproduced using nonnegative 6-channel RGBCAW lighting, 4-channel RGBW lighting, and 3-channel RGB lighting solves as described in detail in reference to FIG. 2D.

Generally describing the images, the matches are visually very close for RGBCAW 503, 523 and RGBW 504,524 lighting reproduction, whereas colors appear too saturated using RGB 505,525 lighting. The images in FIG. 5 suggest that the nonnegative RGBW lighting reproduction performs nearly as well as RGBCAW and suggests that these four spectra may be sufficient for many lighting reproduction applications. The outdoor lighting environment 515 included a sunset lighting condition reproduced with RGBCAW lighting where the light of the setting sun was changing rapidly. The illumination was recorded both before and after photographing the subject, averaging the two sets of color charts and RGB panoramas to solve for the lighting to reproduce.

Figure 6:
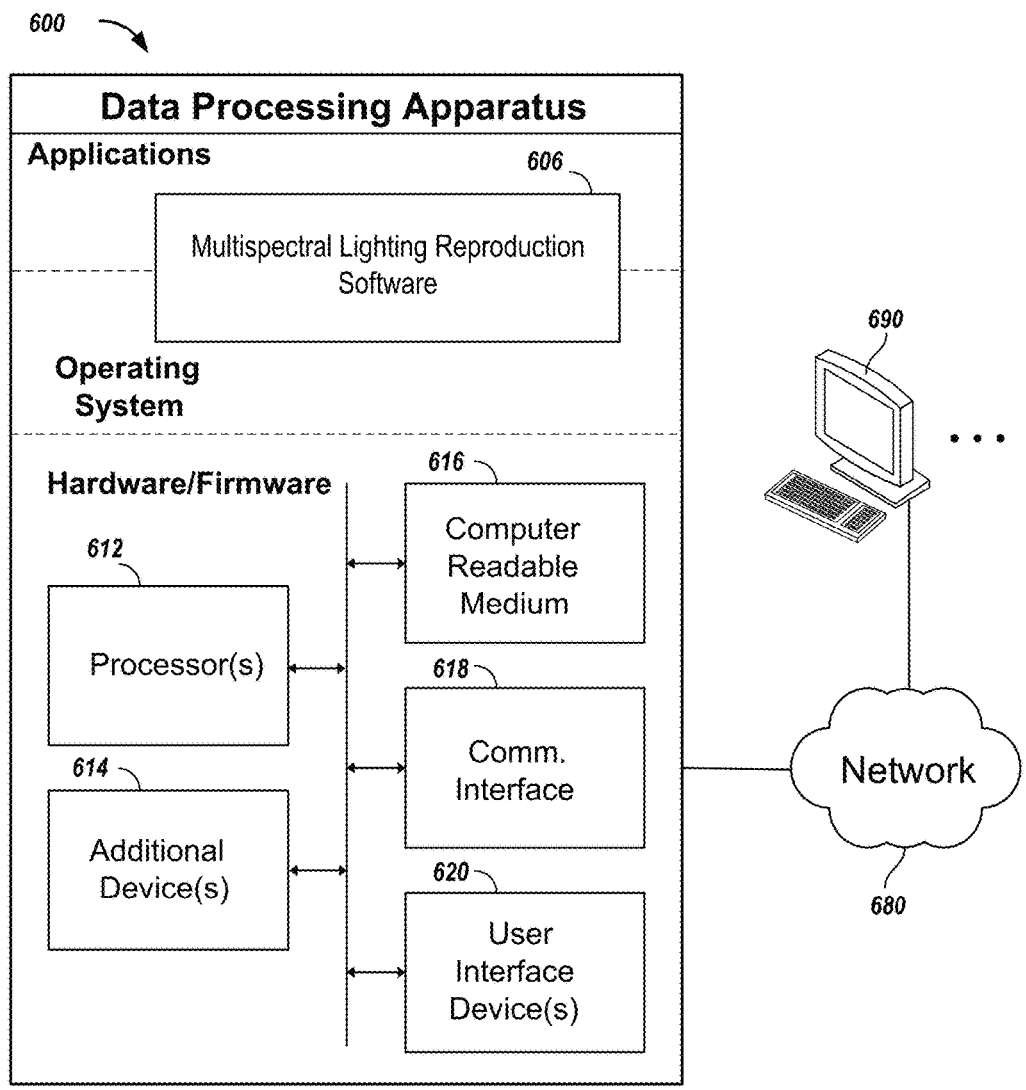
FIG. 6 is a schematic diagram of a data processing system used to implement the systems and methods described herein.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of Multispectral Lighting Reproduction Software 606. The Multispectral Lighting Reproduction Software 606 can implement the systems and techniques described above and variations thereof. Regardless of the operational details of the Multispectral Lighting Reproduction Software 606, the number of software modules used can vary from one implementation to another. In some implementations, the Multispectral Lighting Reproduction Software 606 can be integrated, or otherwise combined, into the same computer program. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. Examples of user interface devices 620 include a display, a camera, a speaker, a microphone, a tactile feedback device, a keyboard, and a mouse. The data processing apparatus 600 can store instructions that implement operations as described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A system comprising:
    one or more light sources having different lighting spectra; and
    one or more computers comprising at least one processor and at least one memory device, the one or more computers programmed to drive the one or more light sources directly using intensity coefficients that have been determined by comparing first data for a multi-color reference object photographed by a camera in a scene with second data for the multi-color reference object photographed when lit by respective ones of the different lighting spectra of the one or more light sources.

2. The system of claim 1, wherein the one or more light sources comprise Light Emitting Diode (LED) light sources that generate the different lighting spectra comprising three or more LED spectra.

3. The system of claim 2, wherein the three or more LED spectra comprise red, green, and blue.

4. The system of claim 3, wherein the three or more LED spectra further comprise at least one of amber and white.

5. The system of claim 1, wherein the one or more light sources are multiple light sources arranged in a geometric shape to illuminate a subject from multiple directions.

6. The system of claim 1, wherein the one or more light sources are multiple light sources arranged in an omnidirectional lighting sphere to illuminate a subject from various directions.

7. The system of claim 1, wherein the one or more computers are programmed to determine the intensity coefficients by solving for the intensity coefficients using non-negative least squares (NNLS).

8. The system of claim 1, wherein the scene has an illumination environment, and the one or more computers are programmed to use the data from photographs of the multi-color reference object taken using different angular sections of the illumination environment as an illuminant for the multi-color reference object to determine the intensity coefficients.

9. The system of claim 8, wherein the one or more computers are programmed to, for a light source, (i) select at least three of a nearest multi-color reference object lighting data among the photographs taken at different angular sections of the illumination environment that are closest to a direction of the light source, (ii) interpolate the selected multi-color reference object lighting data to create an interpolated set of multi-color reference object lighting data, and (iii) determine the intensity coefficients for the light source using the interpolated set of multi-color reference object lighting data.

10. The system of claim 1, wherein the scene included one or more copies of the multi-color reference object oriented in various directions and the illumination environment is recorded using the camera via panoramic photography techniques, and the one or more computers are programmed to, for a light source, (i) identify sets of reference object lighting data corresponding to a subset of multiple copies of the multi-color reference objects that are closest to a position of the light source, (ii) interpolate the sets of reference object lighting data, wherein the one or more copies of the multi-color reference object are oriented in different directions, (iii) scale color channels of the interpolated set of reference object lighting data, based on an average pixel color of a lighting environment area corresponding to the light source, to generate a scaled set of reference object lighting data, and (iv) determine the intensity coefficients for the light source using the scaled set of reference object lighting data.

11. The system of claim 10, wherein the scene included at least a mirrored sphere and a black sphere for recording scene illumination using the camera via panoramic photography techniques, and the one or more computers are programmed to (i) correct first reflection data derived from light reflected from the mirrored sphere and second reflection data derived from light reflected from the black sphere, and (ii) combine the first reflection data and the second reflection data into a high dynamic range (HDR) map.

12. The system of claim 11, wherein the one or more computers are programmed to use the HDR map to determine the intensity coefficients for the light source using a scaled set of multi-color reference object lighting data, the intensity coefficients usable to drive the light sources with a captured multispectral illumination environment.

13. The system of claim 12, wherein the one or more computers are programmed to adjust the intensity coefficients as a function of time based on different frames of a video camera capturing an angular variation of illumination spectra.

14. A method comprising:
    determining light intensity coefficients by minimizing a difference between (i) photograph of a multi-color reference object taken by a camera in a scene and (ii) a recorded set of multiple bases for an appearance of the multi-color reference object from photographs taken of the multi-color reference object when lit by respective ones of multiple light spectra;
    driving light sources in a lighting stage directly using the determined light intensities coefficients; and capturing imagery of a subject in the lighting stage illuminated by the light sources as they are driven using the determined light intensity coefficients.

15. The method of claim 14, wherein the photographs of the multi-color reference object are taken as illuminated by the light sources in the lighting stage, and the light sources comprise Light Emitting Diode (LED) light sources that generate different lighting spectra comprising three or more LED spectra.

16. The method of claim 14, wherein the three or more LED spectra comprise red, green, and blue.

17. The method of claim 16, wherein the three or more LED spectra further comprise at least one of amber and white.

18. The method of claim 14, wherein the light sources are multiple light sources arranged in a geometric shape to illuminate a subject from multiple directions.

19. The method of claim 14, wherein the light sources are multiple light sources arranged in an omnidirectional lighting sphere to illuminate a subject from different directions.

20. The method of claim 14, wherein the determining comprises solving for the light intensity coefficients using nonnegative least squares (NNLS).

21. The method of claim 14, wherein the scene has an illumination environment, and the method comprises directing the camera to take photographs of the multi-color reference object using different angular sections of the illumination environment as an illuminant for the multi-color reference object, and the determining comprises using the photographs taken using the different angular sections of the illumination environment to determine the light intensity coefficients.

22. The method of claim 21, comprising for a light source in the lighting stage:
  selecting at least three of the nearest multi-color reference object lighting data among the photographs taken at different angular sections of the illumination environment that are closest to a direction of the light source;
  interpolating the selected multi-color reference object lighting data to create an interpolated set of multi-color reference object lighting data; and
  determining the light intensity coefficients for the light source using the interpolated set of multi-color reference object lighting data.

23. The method of claim 14, wherein the scene included one or more copies of the multi-color reference object oriented in various directions and the illumination environment is recorded using the camera via panoramic photography techniques, and the method comprises, for a light source,
  identifying sets of reference object lighting data corresponding to a subset of multiple copies of the multi-color reference objects that are closest to a position of the light source;
  interpolating the sets of reference object lighting data, wherein the one or more copies of the multi-color reference object are oriented in different directions;
  scaling color channels of the interpolated set of reference object lighting data, based on an average pixel color of a lighting environment area corresponding to the light source, to generate a scaled set of reference object lighting data;
  determining the intensity coefficients for the light source using the scaled set of reference object lighting data.

24. The method of claim 23, wherein the one or more copies of the multi-color reference object comprise a first multi-color reference object facing the camera, a second oriented vertically upward with respect to the camera by 45 degrees, a third oriented vertically downward with respect to the camera by 45 degrees, a fourth oriented horizontally leftward with respect to the camera by 45 degrees, and a fifth oriented horizontally rightward with respect to the camera by 45 degrees.

25. The method of claim 23, wherein the scene included at least a mirrored sphere and a black sphere for recording using the camera via panoramic photography techniques, and the method comprises:
  correcting first reflection data derived from light reflected from the mirrored sphere and second reflection data derived from light reflected from the black sphere; and
  combining the first reflection data and the second reflection data into a high dynamic range (HDR) map.

26. The method of claim 25, comprising:
  using the HDR map to determine the intensity coefficients for the light source by scaling a set of multi-color reference object lighting data, the intensity coefficients usable to drive the light sources with a captured multispectral illumination environment.

27. The method of claim 26, comprising:
  adjusting the light intensity coefficients as a function of time based on different frames of a video camera capturing an angular variation of illumination spectra.

28. The method of claim 21, wherein directing the camera to take photographs comprises using an apparatus comprising a pan/tilt unit, the camera, the multi-color reference object, and an enclosure configured to allow only a cone of light to fall on the multi-color reference object, and wherein the cone has width chosen to match angular resolution of the lighting stage.

29. A non-transitory computer-readable medium encoding a computer program operable to cause data processing apparatus to perform operations comprising:
  (a) determining light intensity coefficients by minimizing a difference between (i) photograph of a multi-color reference object taken by a camera in a scene and (ii) a recorded set of multiple bases for an appearance of the multi-color reference object from photographs taken of the multi-color reference object when lit by respective ones of multiple light spectra;
  (b) driving light sources in a lighting stage directly using the determined light intensities coefficients.

* * * * *